June 26, 1928.

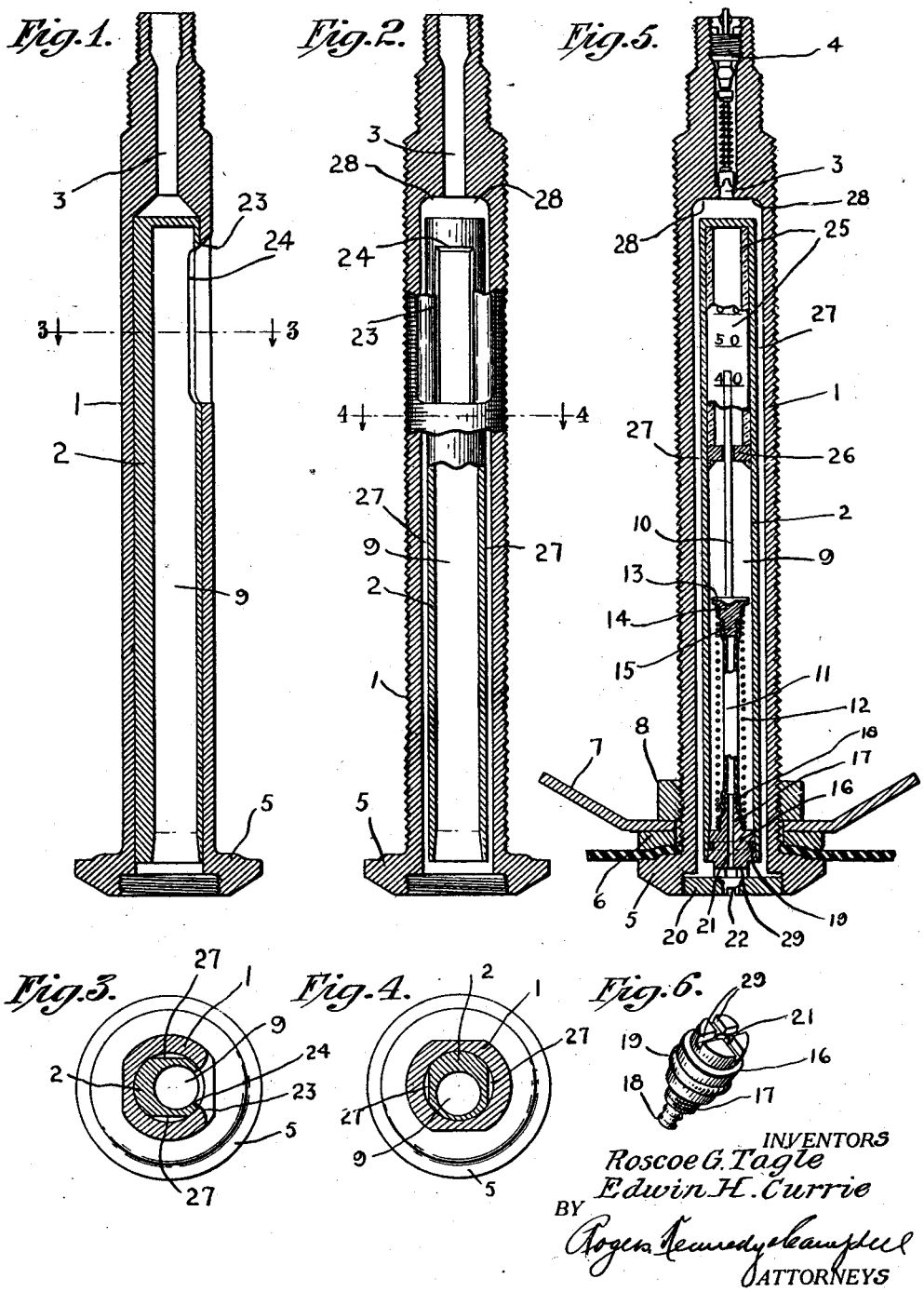

R. G. TAGLE ET AL

TIRE VALVE AND GAUGE

Original Filed April 29, 1922    2 Sheets-Sheet 2

1,675,005

INVENTORS
Roscoe G. Tagle
Edwin H. Currie
BY
ATTORNEYS

Patented June 26, 1928.

1,675,005

UNITED STATES PATENT OFFICE.

ROSCOE G. TAGLE, OF NEW YORK, N. Y., AND EDWIN H. CURRIE, OF EAST ORANGE, NEW JERSEY.

TIRE VALVE AND GAUGE.

Application filed April 29, 1922. Serial No. 557,490. Renewed December 20, 1927.

This invention is directed to an improved form of a pneumatic tire valve and gauge designed for permanent attachment to the inner tube of an automobile tire. The improved device, like that disclosed in a copending application Ser. No. 538,868, comprises generally a casing having an air passage leading from the valve chamber into the interior of the tire and a separate chamber containing a pressure indicator also communicating with the interior of the tire, said separate chamber being closed to the atmosphere and having a sealed opening through which the indicator is visible from the outside. The advantages of a tire valve and gauge of this general construction are fully set forth in the above mentioned application and need not be repeated herein The primary object of the present invention is to provide a device of the kind stated which will be simple in construction, easy and inexpensive to manufacture, and thoroughly reliable and efficient in operation. The various improvements will best be understood from the detailed description to follow.

In the drawings:

Fig. 1 is a longitudinal section taken centrally through the casing in a plane at right angles to its front, and having the interior parts removed;

Fig. 2 is a front view of the casing, partly broken away and partly in section;

Figure 7:
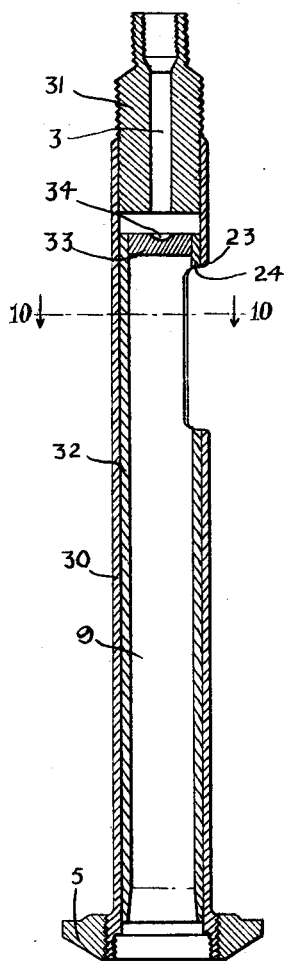
Figure 8:
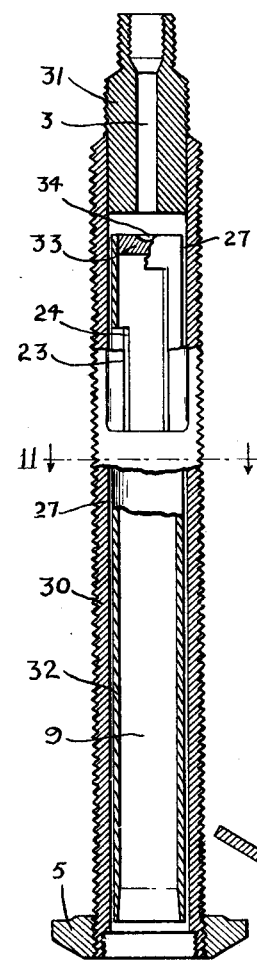
Figure 9:
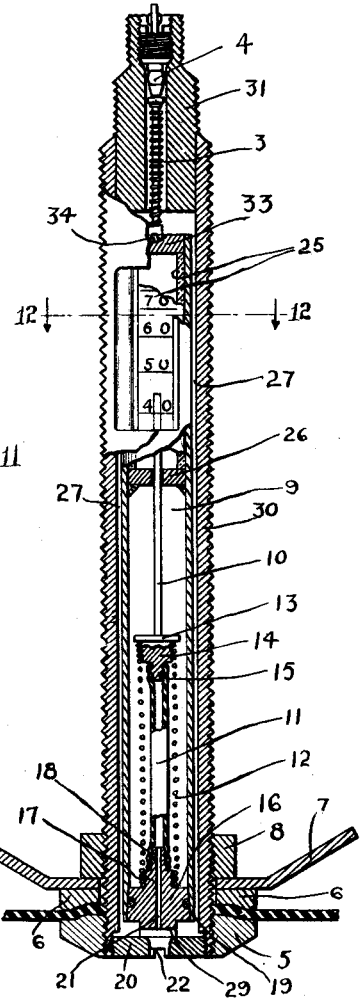
Figure 10:
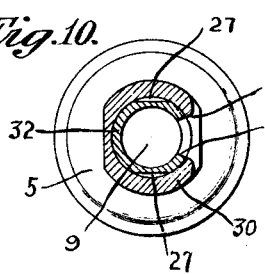
Figure 11:
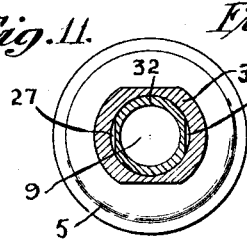
Figure 12:
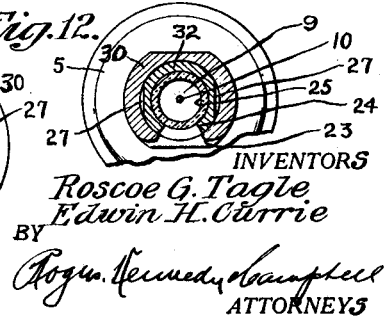

Figs. 3 and 4 are transverse sections taken on the lines 3—3 and 4—4 of Figs. 1 and 2, respectively;

Fig. 5 is a longitudinal section taken through the device in assembled condition;

Fig. 6 is a perspective view of a detail;

Figs. 7 to 12 illustrate a second or alternative embodiment of the invention, Figs. 7, 8 and 9 being similar to Figs. 1, 2 and 5, and Figs. 10, 11 and 12 being transverse sections taken on the lines 10—10, 11—11 and 12—12 of Figs. 7, 8 and 9, respectively.

Referring first to the embodiment illustrated in Figs. 1 to 6, the casing, as shown, comprises two distinct tubular elements 1 and 2, both preferably of metal and one arranged within the other. The outer casing element 1 is exteriorly screw threaded and conforms generally to the shape of the standard valve casing now in use, thus enabling the device to be used in connection with the regular tire equipment. At its upper end, the outer casing element 1 is formed with the customary valve chamber 3 containing a valve mechanism 4 of the well known form; and at its lower end, it is formed with an integral flange 5 which, with the washer 6, supporting plate 7 and clamping nut 8, serves as a means for attaching the device permanently to the tire.

In the ordinary casing, the valve chamber 3 extends clear through the same and communicates directly with the interior of the tire. In the present embodiment, however, said chamber is only made long enough (approximately) to accommodate the valve mechanism 4, below which the casing element 1 is hollowed out so as to provide an enlarged cylindrical cavity extending through the base thereof. The inner casing element 2 fits tightly and snugly in this cylindrical cavity, being made slightly shorter than said cavity for reasons subsequently to appear. In practice, it is proposed to solder the two elements together by a "sweating" process so as not only to hold the inner element rigidly in place but also to render the fit absolutely air-tight.

The inner casing element 2 is also hollowed out, being formed with a cylindrical cavity 9 extending clear through the same except for a small thickness of metal which is left at the top to close the cavity at that point. Located in the cavity 9 is a pressure indicator, which, in the present instance, comprises a movable pointer 10 operatively connected to an extensible pressure tube 11 (preferably of rubber) and a helical spring 12 surrounding the tube. In providing for such connection of the parts, the pointer or indicator 10 is provided with a stepped base member 13 having a screw-threaded portion 14 onto which the upper end of the spring 12 is threaded and a circumferentially ribbed portion 15 to which the upper end of the pressure tube 11 is secured in an airtight manner. At their lower ends, the spring 12 and pressure tube 11 are anchored to a stepped plug 16 fitted in the lower end of the casing element 2 and having, like the member 13, a screw-threaded portion 17 and a ribbed portion 18 for the attachment of the spring and tube, respectively. As will be noted, the plug 16 is of conical form and fits into a corresponding socket formed within the casing element 2, the plug being provided with a soft metal gasket 19 (preferably solder) which insures the air-tight sealing of the lower end of the casing element. A clamping nut 20, screwed into the lower end of the outer casing element 1 and arranged to bear against the bottom face of the plug 16, serves to force the plug home and lock it firmly in place. It should be noted, however, that this clamping nut is not essential and might be omitted, as it is quite feasible to drive the plug into the casing element with sufficient force to hold it in place, or the plug might even be soldered to the element. To establish communication between the pressure tube 11 and the interior of the tire, the plug 16 and clamping nut 20 are formed with central openings 21 and 22, respectively, through which the air may pass.

In order that the indicator may be visible from the outside, the two casing elements 1 and 2 (both being non-transparent) are formed in their front sides with registering openings 23 and 24, respectively, these openings being made long enough to show the indicator in its different positions. Located in the upper end of the inner casing element 2 is a transparent member or tube 25 held in place by a washer 26 which has a central guiding opening for the movable indicator rod 10. In practice, a thin coating of cement or other binding substance is applied to the tube 25 in order to insure a perfect air-tight fit around the opening 23. It is pointed out that, as the parts are thus constructed and arranged, the pressure indicator is located in a chamber entirely closed to the atmosphere and which in fact is absolutely air-tight. As a result, the indicator is protected at all times from outside disturbances and hence less liable to failure, and moreover, even in the event of failure of the indicator, as when the pressure tube becomes ruptured, no air can escape from the tire, due to the closed character of the chamber in which the indicator is located. To facilitate the readings of the indicator, the transparent tube 25 is provided with suitable calibrations, although these might if desired be formed in the movable indicator rod 10 or in the outside of the casing.

It remains to be described how air may be introduced through the composite casing into the tire. In the present instance as a simple and convenient way to accomplish the desired result, the inner casing element 2 is cut away or reduced along its opposite sides and throughout the length thereof, as at 27, to provide air passages extending down between the two casing elements see particularly Figs. 3 and 4. These air passages 27 communicate with the valve chamber 3 through air ports or channels 28 cut in the outer casing element 1 just above the closed top of the inner casing element 2, see Figs. 2 and 5. At their lower ends, the air passages communicate with similar ports or channels 29 formed in the bottom face of the stepped plug 16. Consequently, the air in leaving the central valve chamber 3 passes outwardly in opposite directions through the channels 28 at the top, next downwardly between the two casing elements through the air passages 27, then inwardly through the channels 29 at the base, and finally downwardly through the central opening 22 into the tire, although some of the air will naturally pass upwardly through the opening 21 into the pressure tube 11. It will be remembered that the inner casing element 2 is effectively sealed at all points and moreover is fitted air-tight within the outer casing element 1, so that any possibility of leakage of the air is thoroughly guarded against. However, it will be appreciated that to prevent the leakage of air from the valve chamber, it would only be necessary to form a seal around the opening 23 in the outer casing element, when the fit between the two casing elements at any other point would be entirely immaterial. It hardly needs to be stated that the two casing elements may be constructed or arranged in various other ways to provide the necessary air space between them, and that the number of air passages (whether one only or more) is not so important. The essence of the invention in this respect resides in the fact that the two casing elements are so related as to form between them a suitable air passage leading from the valve chamber into the interior of the tire.

In the embodiment illustrated in Figs. 7 to 12, the outer casing element is itself made up of two distinct parts, to wit, a body portion 30 in the form of a hollow open-ended tube exteriorly screw-threaded, and a head portion 31 fitted air-tight in the upper end of said body portion, as by soldering, and also exteriorly screw-threaded. The head portion 31 accommodates the valve chamber 3 and valve mechanism 4, while the body portion 30 is provided with the tire attaching parts 5, 6, 7 and 8, although the flange 5 in this instance is screw-threaded to the body portion instead of being integral therewith. The outer casing element as thus constituted conforms generally to the standard type of casing and hence may also be used in connection with the regular tire equipment. The inner casing element, in this embodiment, is in the form of an open-ended tube 32, which is closed at the top by a plug 33 fitted air-tight therein, as by soldering. A recess 34 is formed in the upper face of the plug 33 to form a seat for the lower end of the valve stem and to save room. In other respects, the construction is substantially the same as that previously described, the only other notable difference being that communication between the valve chamber 3 and the air-passages 27 is provided for by leaving a space between the head portion 31 and the inner tube 32.

The advantages of the foregoing constructions will be obvious to those skilled in the art and do not require any extended discussion. The parts are extremely simple, although strong and durable, and are such that they can be made and assembled at very low cost and with the greatest ease and facility, and this without involving any radical alteration in the standard tire equipment. In the embodiment first described, the two casing elements are made from solid material, e. g. drop forgings, and hence require some machine work, but the amount of such work is materially reduced by reason of the composite nature of the casing, which enables the air passages, though offset from the central valve chamber, to be produced by the simple operation of grinding off narrow strips of metal along the sides of the inner casing element. In the second embodiment, the machine operations have been reduced to minimum by the employment of the open-ended tubes which go to make up the composite casing. As is well known, these tubes are of standard manufacture and can be bought on the market at exceedingly low cost. Another important advantage present in either embodiment is the increased space allowed for the pressure indicator, whose parts may therefore be made larger and stronger than would otherwise be possible.

The invention has been illustrated herein merely by way of example and in preferred form, and obviously various changes and alterations therein will readily suggest themselves to those skilled in the art without departing from the spirit of the invention or sacrificing its chief advantages. It should be understood therefore that the invention is not limited to any specific form or embodiment except in so far as such limitations are specified in the claims.

While it is preferred to employ a pressure indicator such as that shown and described, there are various other kinds of indicators which might be employed as well. Thus, the indicator pointer, instead of being actuated by pressure from within an extensible pressure tube as described, might be operated by a piston or plunger fitted in the closed chamber and acted on by air admitted directly into the chamber. As a matter of fact, the pointer might be made in the form of a liquid column made to rise and fall under the influence of the air pressure within the tire. The broad feature of the invention in this respect is that an indicator of some kind is located in the inner element of a composite casing.

Having thus described our invention, what we claim is as follows:—

1. In a tire valve and gauge, the combination of a hollow outer casing element having an opening cut through the side, a hollow inner casing element fitted tightly within the outer casing element so as to form an air-tight seal around its side opening, said inner casing element also having an opening cut through its side and registering with that of the outer casing element, a transparent member located within the inner casing element and forming an air-tight seal around the inner edge of the side opening thereof, an air passage formed between the inner and outer casing elements and leading into the interior of the tire, an inflating valve mechanism having its valve chamber communicating with the air passage, and a pressure indicator located within the inner casing element and visible from the outside through the transparent member.

2. In a tire valve and gauge, the combination of a hollow outer casing element provided at its upper end with an inflating valve mechanism and having an opening cut through the side, a hollow inner casing element fitted tightly within the outer casing element so as to form an air-tight seal around its side opening but cut away along one side so as to provide an air passage leading from the valve chamber to the interior of the tire, said inner casing element also having an opening cut through its side and registering with that of the outer casing element, a glass tube fitted air-tight within the inner casing element so as to form an air-tight seal around the inner edge of the side opening thereof, and a pressure indicator located within the inner casing element and visible from the outside through the glass tube.

In testimony whereof, we have affixed our signatures hereto.

ROSCOE G. TAGLE.
EDWIN H. CURRIE.